US012168414B2

(12) United States Patent
Nagasawa

(10) Patent No.: US 12,168,414 B2
(45) Date of Patent: Dec. 17, 2024

(54) AIRBAG DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/409,254

(22) Filed: Jan. 10, 2024

(65) Prior Publication Data
US 2024/0270194 A1 Aug. 15, 2024

(30) Foreign Application Priority Data

Feb. 10, 2023 (JP) ................. 2023-019062

(51) Int. Cl.
B60R 21/231 (2011.01)
B60R 21/0136 (2006.01)
B60R 21/233 (2006.01)
B60R 21/2338 (2011.01)
B60R 21/235 (2006.01)

(52) U.S. Cl.
CPC .... *B60R 21/23138* (2013.01); *B60R 21/0136* (2013.01); *B60R 21/233* (2013.01); *B60R 21/2338* (2013.01); *B60R 21/235* (2013.01); *B60R 2021/23146* (2013.01); *B60R 2021/23308* (2013.01); *B60R 2021/23538* (2013.01)

(58) Field of Classification Search
CPC ............ B60R 21/231; B60R 21/23138; B60R 2021/23146; B60R 21/2338; B60R 21/233; B60R 21/235
See application file for complete search history.

(56) References Cited

U.S. PATENT DOCUMENTS

| 9,663,061 | B2* | 5/2017 | Mihm | B60R 21/23138 |
| 10,023,147 | B2* | 7/2018 | Kwon | B60R 21/23138 |
| 11,407,376 | B2* | 8/2022 | Moon | B60R 21/2338 |
| 11,440,499 | B2* | 9/2022 | Shibahara | B60R 21/23138 |
| 11,505,158 | B2* | 11/2022 | Choi | B60R 21/23138 |
| 11,845,393 | B2* | 12/2023 | Suzuki | B60R 21/23138 |

(Continued)

FOREIGN PATENT DOCUMENTS

| EP | 3838689 A1 | 6/2021 |
| WO | WO 2020/036048 A1 | 2/2020 |

*Primary Examiner* — Faye M Fleming
(74) *Attorney, Agent, or Firm* — MCGINN I.P. LAW GROUP, PLLC

(57) ABSTRACT

An airbag device includes a far-side airbag and a first deployment controller configured to control deployment of the far-side airbag. The far-side airbag is provided in a seat backrest of the seat at a location adjacent to a center console, and includes shoulder and head protection air chambers configured to protect respectively a shoulder and a head, of an occupant. The shoulder protection air chamber includes air chamber elements configured to deploy in a vertical tubular shape. The head protection air chamber is configured to deploy in a semicircular shape. A base fabric of the far-side airbag in a deployed state is longer at a side adjacent to the center console than at a side adjacent to the seat. The shoulder protection air chamber is provided with a restraining tether configured to squeeze the shoulder protection air chamber toward the seat when the shoulder protection air chamber is deployed.

4 Claims, 6 Drawing Sheets

(56) References Cited

U.S. PATENT DOCUMENTS

2013/0076014 A1\* 3/2013 Thomas ............... B60R 21/231
    280/743.1
2024/0140346 A1\* 5/2024 Nagasawa ......... B60R 21/23138

\* cited by examiner

AIRBAG DEVICE

CROSS-REFERENCE TO RELATED APPLICATIONS

The present application claims priority from Japanese Patent Application No. 2023-019062 filed on Feb. 10, 2023, the entire contents of which are hereby incorporated by reference.

BACKGROUND

The disclosure relates to an airbag device.

Airbag devices are in widespread use as safety devices for protecting occupants in a vehicle collision.

A far-side airbag device is an example of such an airbag device that has been in actual use. The far-side airbag device protects an occupant in a side collision of a vehicle by restraining the movement of the occupant caused by the side collision.

An airbag device of this type is described in, for example, International Publication No. 2020/036048. This airbag device includes a first inflatable member, a second inflatable member, a third inflatable member, and a recess. The first inflatable member inflates and deploys on a side of an occupant's shoulder. The second and third inflatable members inflate and deploy in front of and behind the first inflatable member. The recess is formed between the second and third inflatable members. A tether is attached to the second inflatable member and a seat frame so as to pass over the recess, and faces the first inflatable member across the recess. When the airbag is deployed, the tether receives the occupant's shoulder, so that the second inflatable member is deformed toward the front of the occupant.

SUMMARY

An aspect of the disclosure provides an airbag device. The airbag device includes a far-side airbag and a first deployment controller. The far-side airbag is provided in a seat backrest of a seat at a location adjacent to a center console and includes a shoulder protection air chamber and a head protection air chamber. The shoulder protection air chamber is configured to protect a shoulder of an occupant and includes air chamber elements configured to deploy in a vertical tubular shape. The head protection air chamber is configured to deploy in a semicircular shape and protect a head of the occupant. The first deployment controller is configured to control deployment of the far-side airbag. A base fabric of the far-side airbag is longer at a side adjacent to the center console than at a side adjacent to the seat when the far-side airbag is deployed. The shoulder protection air chamber is provided with a restraining tether configured to squeeze the shoulder protection air chamber toward the seat when the shoulder protection air chamber is deployed.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
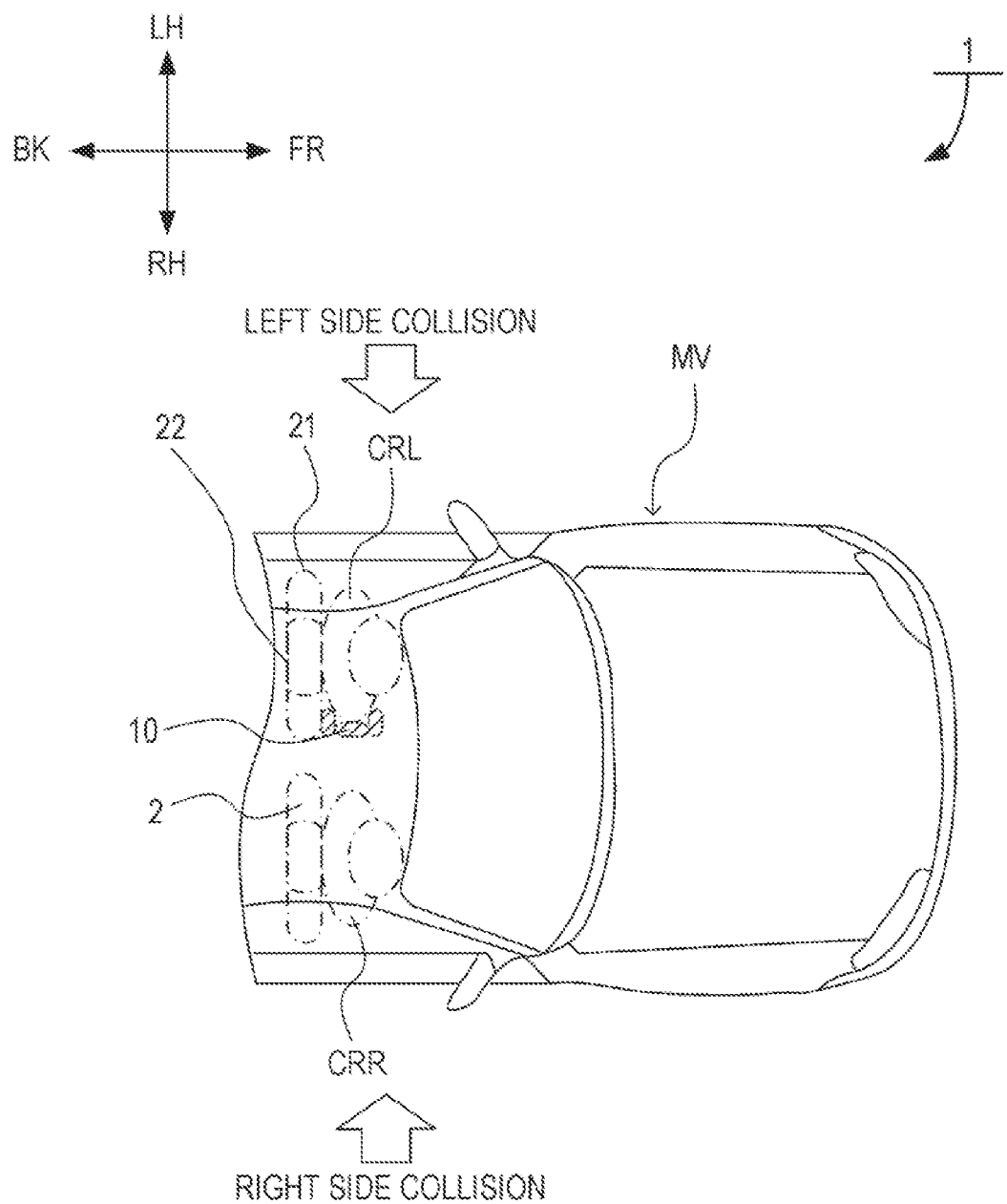
FIG. 1 is a plan view of a vehicle including an airbag device according to an embodiment of the disclosure.

According to the airbag device described in International Publication No. 2020/036048, the tether exerts a reaction force to hold the occupant's shoulder and restrain the movement of the occupant in a side collision of the vehicle.

However, when another occupant is seated in a passenger seat, the occupant in the driver's seat and the occupant in the passenger seat move in different ways due to a difference in transmission of the collision impact, and there is a risk that the occupants in the driver's seat and the passenger seat will collide with each other.

Although there is a known far-side airbag that addresses the above-described situation, this type of far-side airbag is generally shaped for a collision from one side, and tends to have inferior protective performance against a collision on a side opposite to the intended side.

The inventors of the disclosure have found that the far-side airbag provided to address the above-described situation may fail to appropriately restrain the movements of the occupants in the driver's seat and the passenger seat. For example, the far-side airbag including a shoulder protection air chamber and a head protection air chamber may be designed to deploy into a shape suitable for the movements of the occupants in the driver's seat and the passenger seat in response to an impact of a side collision on the right side in the vehicle width direction as viewed in a vehicle traveling direction. In such a case, the movements of the occupants in the driver's seat and the passenger seat cannot be appropriately restrained when the occupants receive an impact of a side collision on the left side in the vehicle width direction as viewed in the vehicle traveling direction.

To address the above-described situation with one far-side airbag, it is desirable to adaptively change the shape into which the far-side airbag is deployed depending on the direction of the side collision of the vehicle.

Although the above-described problem can also be solved by providing the driver's seat and the passenger seat with individual far-side airbags, this increases the overall system cost because two airbag devices are to be mounted.

It is desirable to provide an inexpensive airbag device that operates together with an existing sensing system to protect occupants from a side collision of a vehicle with one far-side airbag.

Embodiment

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

An airbag device 1 according to the embodiment will be described with reference to FIGS. 1 to 6B.

In FIGS. 1, 2, 5A, 5B, 6A, and 6B, arrows FR, BK, UP, and DN respectively indicate forward, backward, upward, and downward directions with respect to a vehicle. Also, arrows LH and RH respectively indicate leftward and rightward directions in the vehicle width direction as viewed in the vehicle traveling direction.

In the following description, up-down, front-back, and left-right directions are respectively up-down, front-back, and left-right directions with respect to the vehicle traveling direction unless specified otherwise.

FIG. 1 illustrates a vehicle MV including the airbag device 1 according to the present embodiment.

FIG. 1 illustrates occupants and a far-side airbag 10 of the airbag device. The occupants are seated in seats 2, each including a seat backrest 21 and a head rest 22. CRL and CRR respectively denote the occupant on the left side and the occupant on the right side in the vehicle width direction as viewed in the vehicle traveling direction. The far-side airbag 10 is provided in the left seat backrest 21 in the vehicle width direction as viewed in the vehicle traveling direction at a location adjacent to a center console. When a collision occurs on the left or right side in the vehicle width direction as viewed in the vehicle traveling direction, the far-side airbag 10 is deployed in a form that differs depending on the direction of the collision.

The far-side airbag 10 is provided in either one of the seat backrests 21 at a location adjacent to the center console. In the embodiment described herein, the far-side airbag 10 is provided in the left seat backrest 21 in the vehicle width direction as viewed in the vehicle traveling direction will be described.

Structure of Far-Side Airbag 10

Figure 2:
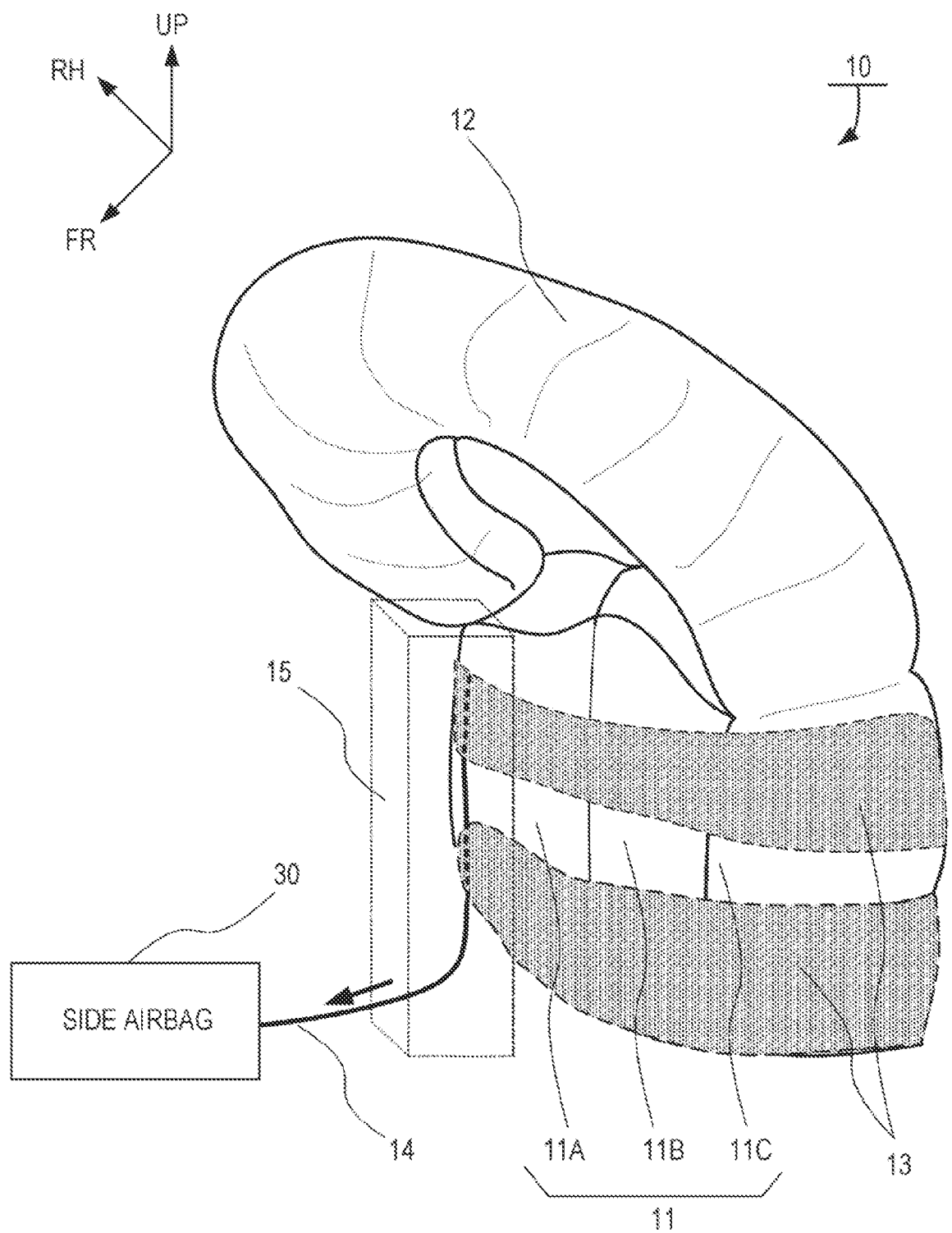
FIG. 2 is an enlarged perspective view of the airbag device according to the embodiment of the disclosure.

As illustrated in FIG. 2, the far-side airbag 10 according to the present embodiment includes, for example, a shoulder protection air chamber 11 and a head protection air chamber 12. The shoulder protection air chamber 11 includes air chamber elements 11A, 11B, and 11C that deploy into a vertical tubular shape, and protects the shoulders of the occupants CRL and CRR. The head protection air chamber 12 deploys into a semicircular shape and protects the heads of the occupants CRL and CRR.

The far-side airbag 10 is provided in the left seat backrest 21 in the vehicle width direction at a location adjacent to the center console.

A base fabric of the far-side airbag 10 is longer at the side adjacent to the center console than at the side adjacent to the seat 2 when the far-side airbag 10 is deployed.

The shoulder protection air chamber 11 of the far-side airbag 10 is provided with restraining tethers 13 that squeeze the shoulder protection air chamber 11 toward the seat 2 when the shoulder protection air chamber 11 is deployed.

The restraining tethers 13 are fixed to the shoulder protection air chamber 11 with running stitches, and are provided with a sewn-in tether 14 sewn therein and coupled to a side airbag 30 for protecting the occupant CRL seated in the left seat 2 in the vehicle width direction as viewed in the vehicle traveling direction. When the side airbag 30 is deployed, the sewn-in tether 14 pulls the running stitches in the sewing direction.

The air chamber elements 11A, 11B, and 11C of the far-side airbag 10 that deploy in the vertical tubular shape are joined at a predetermined angle, and are capable of changing the form in which the far-side airbag 10 deploys so that the head protection air chamber 12 falls toward the occupant CRR in the adjacent seat.

For example, when the restraining tethers 13 are removed and the air chamber elements 11A, 11B, and 11C that deploy in the vertical tubular shape are released from the restrained state, the form in which the air chamber elements 11A, 11B, and 11C are deployed is changed to, for example, a fan shape.

The above-described predetermined angle is determined based on the relationship between the length of a bottom of the semicircular head protection air chamber 12 joined to the air chamber elements 11A, 11B, and 11C and the length of the upper curve of the fan shape into which the air chamber elements 11A, 11B, and 11C deploy.

The far-side airbag 10 is placed in a storage case 15 together with an inflator (not illustrated). The storage case 15 is disposed in the seat backrest 21 at a location close to the shoulder of the occupant CRL.

Electrical Configuration of Airbag Device 1

The electrical configuration of the airbag device 1 according to the present embodiment will be described with reference to FIG. 3.

Figure 3:
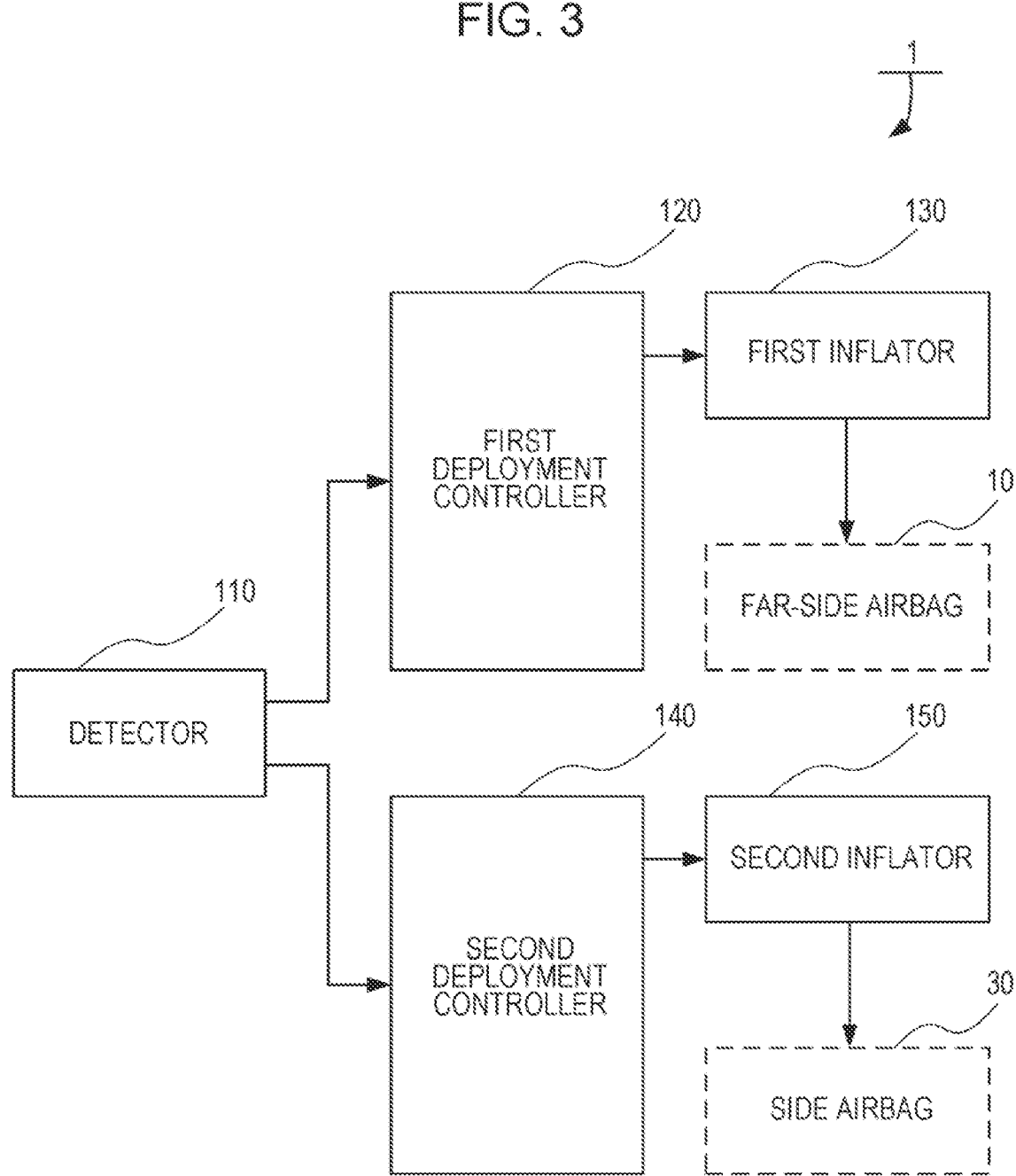
FIG. 3 illustrates the configuration of the airbag device according to the embodiment of the disclosure.

As illustrated in FIG. 3, the airbag device 1 according to the present embodiment includes a detector 110, a first deployment controller 120, a first inflator 130, a second deployment controller 140, and a second inflator 150.

The detector 110 detects the direction of a collision of the vehicle.

The detector 110 is composed of, for example, sensors, and include a sensor that senses a collision on the right side of the vehicle as viewed in the vehicle traveling direction and a sensor that senses a collision on the left side of the vehicle as viewed in the vehicle traveling direction.

The detector 110 outputs sensor information obtained by the above-described sensors to the first deployment controller 120 and the second deployment controller 140.

The detector 110 may be composed of, for example, acceleration sensors that detect an impact and vibration of the vehicle as accelerations.

The acceleration sensors may be piezoresistive sensors that utilize a change in the electrical resistance of a semiconductor or capacitive sensors that detect a change in the gap between movable and fixed parts of interdigital electrodes as a capacitance.

Another acceleration sensor that detects an acceleration of the floor may be provided in addition to the acceleration sensors for detecting a collision, and accelerations obtained by both acceleration sensors may be used to detect and determine the collision.

The first deployment controller 120 controls deployment of the far-side airbag 10.

For example, the first deployment controller 120 controls activation of the first inflator 130 described below based on the sensor information obtained from the detector 110.

In the present embodiment, the first deployment controller 120 carries out activation control of the first inflator 130 described below when sensor information received from the detector 110 indicates detection of a collision on the right side of the vehicle as viewed in the vehicle traveling direction or detection of a collision on the left side of the vehicle as viewed in the vehicle traveling direction.

When the first inflator 130 receives an activation signal from the first deployment controller 120, the first inflator 130 supplies high-pressure gas to the far-side airbag 10 to inflate and deploy the far-side airbag 10.

The second deployment controller 140 controls deployment of the side airbag 30.

For example, the second deployment controller 140 controls activation of the second inflator 150 described below based on the sensor information obtained from the detector 110.

In the present embodiment, the second deployment controller 140 carries out activation control of the second inflator 150 described below when the sensor information received from the detector 110 indicates detection of a collision on the left side of the vehicle as viewed in the vehicle traveling direction among collisions on the right and left sides of the vehicle as viewed in the vehicle traveling direction.

When the second inflator 150 receives an activation signal from the second deployment controller 140, the second inflator 150 supplies high-pressure gas to the side airbag 30 to inflate and deploy the side airbag 30.

Process of Airbag Device 1

A process of the airbag device 1 according to the present embodiment will be described with reference to FIGS. 4 to 6B.

Figure 4:
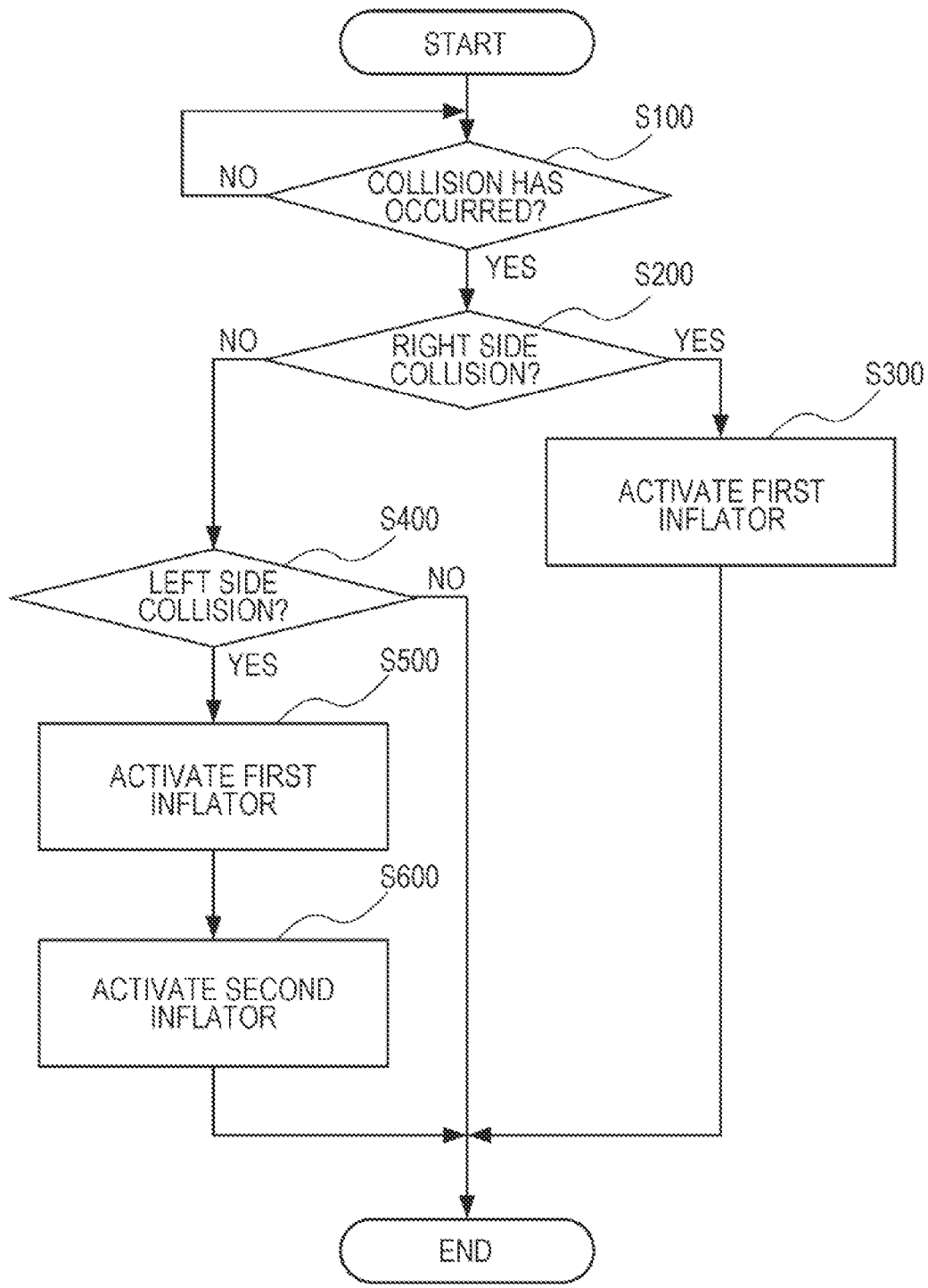
FIG. 4 is a process flowchart of the airbag device according to the embodiment of the disclosure.

Referring to FIG. 4, the first deployment controller 120 and the second deployment controller 140 determine whether a collision of the vehicle MV has occurred based on detection signals (sensor signals) from the detector 110 (step S100).

When it is determined that there is no collision of the vehicle MV (NO in step S100), the first deployment controller 120 and the second deployment controller 140 operate in a standby mode.

Figure 5A:
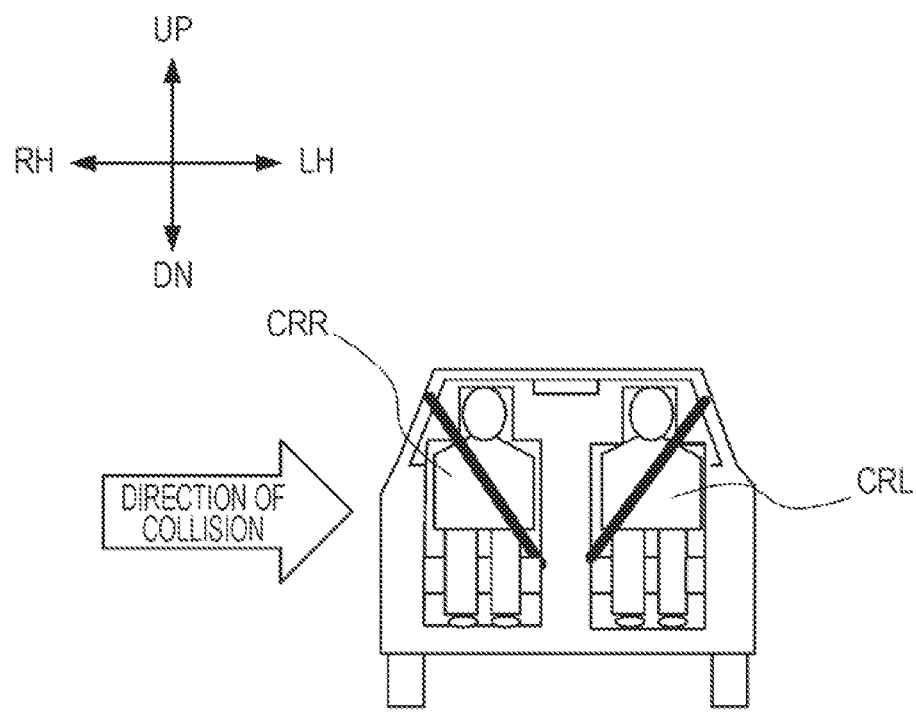
FIGS. 5A and 5B schematically illustrate a direction of a side collision and the form in which a far-side airbag deploys in the airbag device according to the embodiment of the disclosure.
Figure 5B:
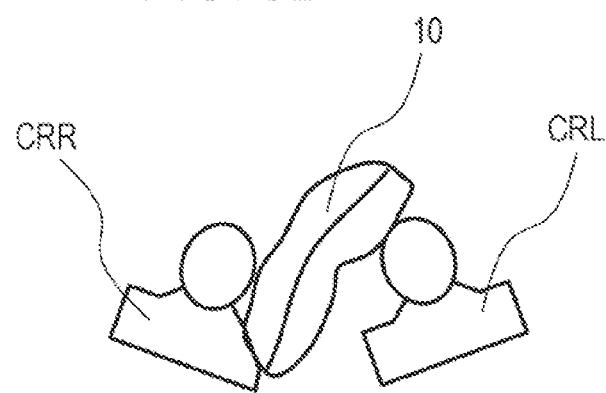

When it is determined that a collision of the vehicle MV has occurred (YES in step S100), the first deployment controller 120 and the second deployment controller 140 determine whether the collision is on the right side of the vehicle MV as viewed in the vehicle traveling direction, as illustrated in FIGS. 5A and 5B (step S200).

When it is determined that the collision is on the right side of the vehicle MV (YES in step S200), the first deployment controller 120 activates the first inflator 130 and ends the process (step S300).

In this case, the second deployment controller 140 does not activate the second inflator 150.

Accordingly, the high-pressure gas supplied by the first inflator 130 inflates and deploys the air chamber elements 11A, 11B, and 11C that constitute the shoulder protection air chamber 11 of the far-side airbag 10, and then inflates and deploys the head protection air chamber 12 of the far-side airbag 10.

The base fabric of the far-side airbag 10 is longer at the side adjacent to the center console than at the side adjacent to the seat 2 when the far-side airbag 10 is deployed, and the shoulder protection air chamber 11 is provided with the restraining tethers 13 that squeeze the shoulder protection air chamber 11 toward the seat 2 when the shoulder protection air chamber 11 is deployed. Therefore, as illustrated in FIG. 5B, the head protection air chamber 12 deploys in a curved shape so as to cover the head of the occupant CRL on the left side in the vehicle width direction as viewed in the vehicle traveling direction of the vehicle MV.

When the first deployment controller 120 and the second deployment controller 140 determine that the collision is not on the right side of the vehicle MV (NO in step S200), the first deployment controller 120 and the second deployment controller 140 determine whether the collision is on the left side of the vehicle MV (step S400).

When it is determined that the collision is not on the left side of the vehicle MV (NO in step S400), the first deployment controller 120 and the second deployment controller 140 end the process.

When the first deployment controller 120 and the second deployment controller 140 determine that the collision is on the left side of the vehicle MV (YES in step S400), the first deployment controller 120 activates the first inflator 130 (step S500).

Accordingly, the high-pressure gas supplied by the first inflator 130 inflates and deploys the air chamber elements 11A, 11B, and 11C that constitute the shoulder protection air chamber 11 of the far-side airbag 10, and then inflates and deploys the head protection air chamber 12 of the far-side airbag 10.

The base fabric of the far-side airbag 10 is longer at the side adjacent to the center console than at the side adjacent to the seat 2 when the far-side airbag 10 is deployed, and the shoulder protection air chamber 11 is provided with the restraining tethers 13 that squeeze the shoulder protection air chamber 11 toward the seat 2 when the shoulder protection air chamber 11 is deployed. Therefore, as illustrated in FIG. 5B, the head protection air chamber 12 deploys in a curved shape so as to cover the head of the occupant CRL on the left side in the vehicle width direction as viewed in the vehicle traveling direction.

Next, the second deployment controller 140 activates the second inflator 150 (step S600).

Accordingly, the high-pressure gas supplied by the second inflator 150 inflates and deploys the side airbag 30.

When the side airbag 30 is inflated and deployed, the sewn-in tether 14 that couples the side airbag 30 to the restraining tethers 13 is pulled toward the side airbag 30 (in the direction of the arrow in FIG. 2). Accordingly, the running stitches that fix the restraining tethers 13 are pulled in the sewing direction.

When the sewn-in tether 14 is pulled toward the side airbag 30, the running stitches that hold the restraining tethers 13 restraining the shoulder protection air chamber 11 break, and the restraining tethers 13 are released from the surface of the shoulder protection air chamber 11.

When the restraining tethers 13 are released from the surface of the shoulder protection air chamber 11, the air chamber elements 11A, 11B, and 11C are released from the restrained state, and the form in which the air chamber elements 11A, 11B, and 11C are deployed is changed into, for example, a fan shape.

Figure 6A:
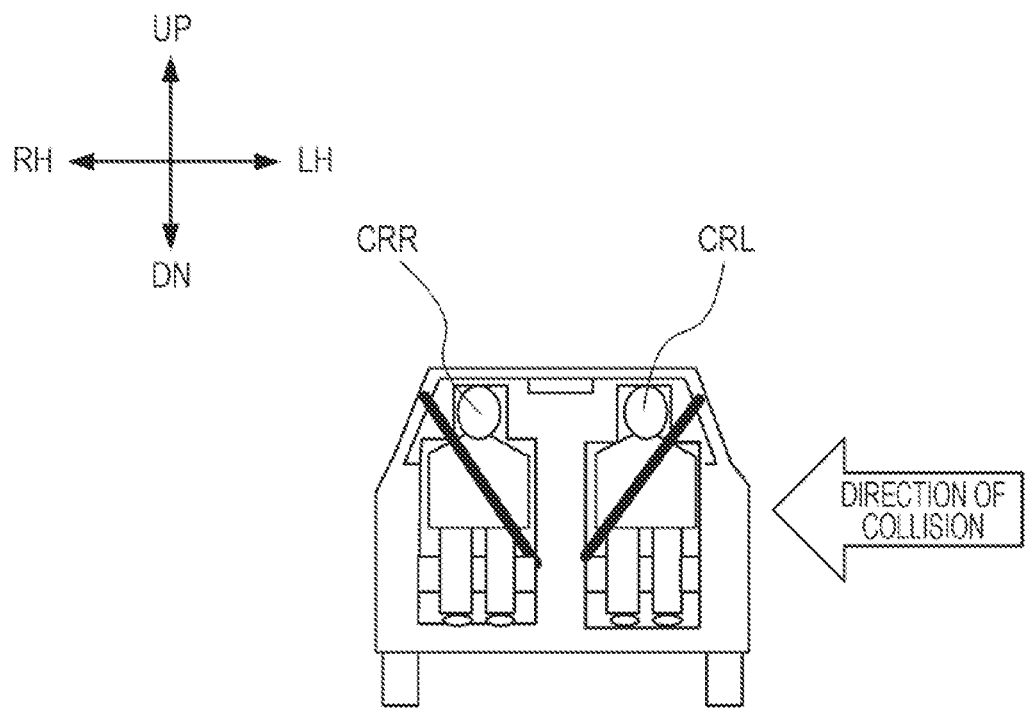
FIGS. 6A and 6B schematically illustrate a direction of a side collision and the form in which the far-side airbag deploys in the airbag device according to the embodiment of the disclosure.
Figure 6B:
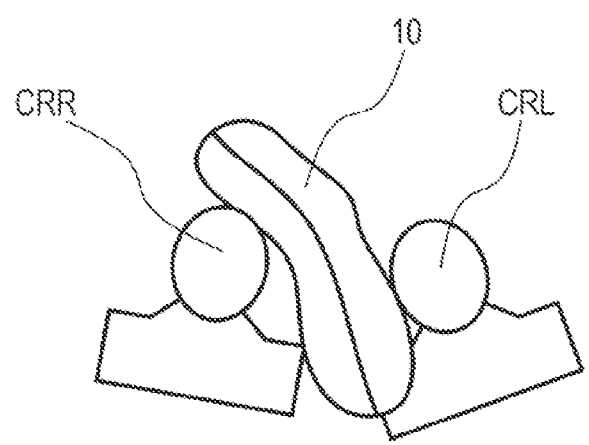

When the form in which the air chamber elements 11A, 11B, and 11C that constitute the shoulder protection air chamber 11 are deployed is changed into a fan shape, as illustrated in FIG. 6B, the head protection air chamber 12 deploys in a curved shape so as to cover the head of the occupant CRR on the right side in the vehicle width direction as viewed in the vehicle traveling direction. Then, the process is ended.

Operations and Advantages

As described above, the airbag device 1 according to the present embodiment includes the far-side airbag 10 and the first deployment controller 120. The far-side airbag 10 is provided in one seat backrest 21 at a location adjacent to the center console, and includes the shoulder protection air chamber 11 and the head protection air chamber 12. The shoulder protection air chamber 11 includes the air chamber elements 11A, 11B, and 11C configured to deploy in a vertical tubular shape, and is configured to protect the shoulders of the occupants CRR and CRL. The head protection air chamber 12 is configured to deploy in a semicircular shape and protect the heads of the occupants CRR and CRL. The first deployment controller 120 controls deployment of the far-side airbag 10. The base fabric of the far-side airbag 10 is longer at the side adjacent to the center console than at the side adjacent to the seat 2 when the far-side airbag 10 is deployed. The shoulder protection air chamber 11 is provided with the restraining tethers 13 that squeeze the shoulder protection air chamber 11 toward the seat 2 when the shoulder protection air chamber 11 is deployed.

The far-side airbag 10 is provided in the seat backrest 21 at one side as viewed in the vehicle traveling direction at a location adjacent to the center console.

Therefore, the overall system cost can be reduced compared to when the airbag is provided in each of the left and right seats in the vehicle width direction as viewed in the vehicle traveling direction as in the related art.

The far-side airbag 10 includes the shoulder protection air chamber 11 and the head protection air chamber 12. The shoulder protection air chamber 11 includes the air chamber elements 11A, 11B, and 11C configured to deploy in a vertical tubular shape, and is configured to protect the shoulders of the occupants CRR and CRL. The head protection air chamber 12 is configured to deploy in a semicircular shape and protect the heads of the occupants CRR and CRL.

Therefore, when a collision occurs on the right side or the left side of the vehicle as viewed in the vehicle traveling direction, the shoulders and heads of the occupants CRR and CRL can be protected from the impact of the collision.

The base fabric of the far-side airbag 10 is longer at the side adjacent to the center console than at the side adjacent to the seat 2 when the far-side airbag 10 is deployed. The shoulder protection air chamber 11 is provided with the restraining tethers 13 that squeeze the shoulder protection air chamber 11 toward the seat 2 when the shoulder protection air chamber 11 is deployed.

In a default deployment, as illustrated in FIG. 5B, the head protection air chamber 12 of the far-side airbag 10 deploys in a curved shape so as to cover the head of the occupant CRL on the left side in the vehicle width direction as viewed in the vehicle traveling direction of the vehicle MV. This is due to the base fabric being longer at the side adjacent to the center console than at the side adjacent to the seat 2, and the shoulder protection air chamber 11 being provided with the restraining tethers 13 that squeeze the shoulder protection air chamber 11 toward the seat 2 when the shoulder protection air chamber 11 is deployed.

When the restraining tethers 13 are released from the surface of the shoulder protection air chamber 11, the air chamber elements 11A, 11B, and 11C that constitute the shoulder protection air chamber 11 are released from the restrained state. Accordingly, for example, the form in which the shoulder protection air chamber 11 is deployed is changed into a fan shape and, as illustrated in FIG. 6B, the head protection air chamber 12 deploys in a curved shape so as to cover the head of the occupant CRR on the right side in the vehicle width direction as viewed in the vehicle traveling direction.

Thus, the occupants CRR and CRL who move in different ways depending on the direction of a side collision of the vehicle can be appropriately protected by one far-side airbag 10.

The airbag device 1 according to the present embodiment further includes the side airbag 30 and the second deployment controller 140. The side airbag 30 is provided in the seat backrest 21 at one side as viewed in the vehicle traveling direction at a location adjacent to the door. The second deployment controller 140 controls deployment of the side airbag 30. The restraining tethers 13 are fixed with the running stitches, and are provided with the sewn-in tether 14 sewn therein and coupled to the side airbag 30. When the side airbag 30 is deployed, the sewn-in tether 14 pulls the running stitches in the sewing direction.

The restraining tethers 13 are fixed with the running stitches, and the sewn-in tether 14 is sewn in the restraining tethers 13 and coupled to the side airbag 30.

When the side airbag 30 is deployed and the sewn-in tether 14 pulls the running stitches in the sewing direction, the running stitches that hold the restraining tethers 13 break, so that the restraining tethers 13 are released from the surface of the shoulder protection air chamber 11.

When the restraining tethers 13 are released from the surface of the shoulder protection air chamber 11, the air chamber elements 11A, 11B, and 11C that constitute the shoulder protection air chamber 11 are released from the restrained state. Accordingly, for example, the form in which the shoulder protection air chamber 11 is deployed is changed into a fan shape and, as illustrated in FIG. 6B, the head protection air chamber 12 deploys in a curved shape so as to cover the head of the occupant CRR on the right side in the vehicle width direction as viewed in the vehicle traveling direction.

Thus, the occupants CRR and CRL who move in different ways depending on the direction of a side collision of the vehicle can be appropriately protected by one far-side airbag 10.

In the airbag device 1 according to the present embodiment, the air chamber elements 11A, 11B, and 11C configured to deploy in the vertical tubular shape are joined at a predetermined angle, and the far-side airbag 10 deploys such that the head protection air chamber 12 falls toward the occupant CRR in the adjacent seat.

The above-described predetermined angle is determined based on the relationship between the length of a bottom of the semicircular head protection air chamber 12 joined to the air chamber elements 11A, 11B, and 11C and the length of the upper curve of the fan shape into which the air chamber elements 11A, 11B, and 11C deploy.

The air chamber elements 11A, 11B, and 11C of the far-side airbag 10 that deploy in the vertical tubular shape are joined at a predetermined angle so that the form in which the far-side airbag 10 is deployed can be changed to cause the head protection air chamber 12 to fall toward the occupant CRR in the adjacent seat.

For example, when the restraining tethers 13 are removed and the air chamber elements 11A, 11B, and 11C that deploy in the vertical tubular shape are released from the restrained state, the form in which air chamber elements 11A, 11B, and 11C are deployed is changed to, for example, a fan shape.

Thus, the occupants CRR and CRL who move in different ways depending on the direction of a side collision of the vehicle can be appropriately protected by one far-side airbag 10.

The airbag device 1 according to the present embodiment further includes the detector 110 that detects the direction of collision of the vehicle MV. When the detector 110 detects a side collision on the left side in the vehicle width direction as viewed in the vehicle traveling direction, the second deployment controller 140 causes the side airbag 30 to deploy.

The inventors of the disclosure have found that the occupants CRR and CRL move as illustrated in FIG. 5B in a side collision on the right side in the vehicle width direction as viewed in the vehicle traveling direction, and as illustrated in FIG. 6B in a side collision on the left side in the vehicle width direction as viewed in the vehicle traveling direction.

Thus, the occupants CRR and CRL move in different ways between a side collision on the right side in the vehicle width direction as viewed in the vehicle traveling direction and a side collision on the left side in the vehicle width direction as viewed in the vehicle traveling direction. To cover these movements of the occupants CRR and CRL with one far-side airbag 10, the far-side airbag 10 is to be deployed in different forms depending on the direction of the side collision.

According to the airbag device 1 of the present embodiment, the form in which the far-side airbag 10 deploys is changed by using the deployment of the side airbag 30 provided in the left seat 2 in the vehicle width direction as viewed in the vehicle traveling direction.

Thus, the occupants CRR and CRL who move in different ways depending on the direction of a side collision of the vehicle can be appropriately protected by one far-side airbag 10.

The airbag device 1 of the disclosure can be realized by recording the processes of the first deployment controller 120 and the second deployment controller 140 in a recording medium readable by a computer system, and causing the first deployment controller 120 and the second deployment controller 140 to read and execute programs recorded in the recording medium. Here, the term "computer system" includes an operating system (OS) and hardware such as peripheral devices.

The term "computer system" also includes an environment provided (or displayed) on a website when the world wide web (WWW) system is used. The above-described programs may be transmitted from a computer system storing the programs in a storage device or the like to another computer system via a transmission medium or by transmission waves through a transmission medium. The term "transmission medium" for transmitting the programs means a medium having an information transmission function, for example, a network (communication network), such as the Internet, or a communication line, such as a telephone line.

The programs may realize a part of the above-described functions. The programs may be a so-called difference file (difference program) that can realize the above-described functions in combination with a program prerecorded in the computer system.

Although an embodiment of the disclosure has been described above with reference to the drawings, the specific configuration is not limited to the above-described embodiment, and other designs, for example, may be included without departing from the gist of the disclosure.

According to one or more embodiments of the disclosure, an inexpensive airbag device that operates together with an existing sensing system to protect occupants from a side collision of a vehicle with one far-side airbag can be provided.

The first deployment controller 120 and the second deployment controller 140 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the first deployment controller 120 and the second deployment controller 140. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An airbag device comprising:
a far-side airbag provided in a seat backrest of a seat at a location adjacent to a center console and comprising a shoulder protection air chamber and a head protection air chamber, the shoulder protection air chamber being configured to protect a shoulder of an occupant and comprising air chamber elements configured to deploy in a vertical tubular shape, the head protection air chamber being configured to deploy in a semicircular shape and protect a head of the occupant; and
a first deployment controller configured to control deployment of the far-side airbag, wherein
a base fabric of the far-side airbag is longer at a side adjacent to the center console than at a side adjacent to the seat when the far-side airbag is deployed, and
the shoulder protection air chamber is provided with a restraining tether configured to squeeze the shoulder protection air chamber toward the seat when the shoulder protection air chamber is deployed.

2. The airbag device according to claim 1, further comprising:
a side airbag provided in the seat backrest at a location adjacent to a door; and
a second deployment controller configured to control deployment of the side airbag, wherein
the restraining tether is fixed with a running stitch and is provided with a sewn-in tether that is sewn in the restraining tether and coupled to the side airbag, and the sewn-in tether is configured to pull the running stitch in a sewing direction when the side airbag is deployed.

3. The airbag device according to claim 2, wherein
the air chamber elements configured to deploy in the vertical tubular shape are joined at a predetermined angle, and
the far-side airbag is configured to deploy such that the head protection air chamber falls toward an occupant in an adjacent seat adjacent to the seat.

4. The airbag device according to claim 3, further comprising:
a detector configured to detect a direction of a vehicle collision, wherein
the second deployment controller is configured to cause the side airbag to deploy when the detector detects a side collision on a side at which the seat provided with the far-side airbag is disposed.

\* \* \* \* \*